Figure 1:
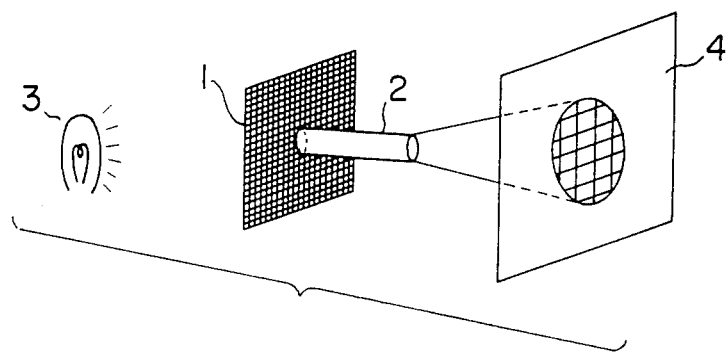

United States Patent [19]

Nakauchi et al.

[11] Patent Number: 4,593,975

[45] Date of Patent: Jun. 10, 1986

[54] IMAGE-TRANSMITTING SYNTHETIC RESIN ROD AND A PROCESS FOR PRODUCING THE SAME

[75] Inventors: Jun Nakauchi; Yasuteru Tahara, both of Otake, Japan

[73] Assignee: Mitsubishi Rayon Co., Ltd., Tokyo, Japan

[21] Appl. No.: 548,445

[22] Filed: Nov. 3, 1983

[30] Foreign Application Priority Data

Nov. 9, 1982 [JP] Japan ................. 57-196590

[51] Int. Cl.⁴ ............... C08F 120/32; G02B 5/14
[52] U.S. Cl. ................ 350/96.34; 525/327.3; 526/273
[58] Field of Search ............ 350/96.29, 96.30, 96.33, 350/96.34; 526/273; 525/327.3

[56] References Cited

U.S. PATENT DOCUMENTS

| | | | |
|---|---|---|---|
| 3,639,035 | 2/1972 | Irie | 350/178 |
| 3,819,782 | 6/1974 | Irie | 264/49 |
| 3,838,905 | 10/1974 | Irie | 350/96 R |
| 3,860,567 | 1/1975 | Wentworth | 525/327.3 |
| 3,955,015 | 5/1976 | Ohtsuka et al. | 427/163 |

Primary Examiner—Harry Wong, Jr.

Attorney, Agent, or Firm—Oblon, Fisher, Spivak, McClelland & Maier

[57] ABSTRACT

An improved image-transmitting synthetic resin rod comprising a reaction product of an acrylic resin [1] containing epoxy groups with a material [2] having a refractive index 0.15–0.35 lower than that of said acrylic resin [1], and distributed in said rod so as to satisfy equation (1):

$$n_r^2 = n_a^2[1 - (gr)^2 + h_4(gr)^4 + h_6(gr)^6] \quad (1)$$

$$0.03 \leq gr_0 \leq 0.45$$

$$|h_4 - \tfrac{2}{3}| \leq 100$$

$$|h_6 + 17/45| \leq 1,000$$

wherein r is the radial distance from the center axis of the rod ($0 \leq r \leq r_0$),
  $r_0$ is the radius of the rod,
  $n_r$ is the refractive index at point r,
  $n_a$ is the refractive index at the center of the rod,
  g is the distribution constant of the refractive index, and
  $h_4$ and $h_6$ are high order coefficients,
and a process for producing the same.

13 Claims, 2 Drawing Figures

IMAGE-TRANSMITTING SYNTHETIC RESIN ROD AND A PROCESS FOR PRODUCING THE SAME

This invention relates to an improved image-transmitting synthetic resin rod and a process for producing the same.

A glass rod in which the refractive index gradually decreases from the center axis out to the surface of the fiber has already been proposed as an image-transmitting rod in Japanese Patent Publication No. 816/1972. However, this type of image-transmitting rod is difficult to manufacture and thus expensive, in addition to which it has poor flexibility.

In view of such problems with the image-transmitting glass rod, processes for producing image-transmitting synthetic resin rods capable of providing high productivity and excellent flexibility have been proposed. These image-transmitting synthetic resin rods include five general types: (i) structures in which the concentration of metal ions varies continuously from the center axis to the surface of a synthetic resin rod made of an ion-crosslinked polymer (Japanese Patent Publication No. 26913/1972), (ii) structures formed by partially dissolving off at least one of the polymers in a synthetic resin rod made from a mixture of two or more transparent polymers of different refractive indexes (Japanese Patent Publication No. 28059/1972), (iii) structures in which the refractive index distribution varying continuously from the surface of the interior, is produced by photo-polymerizing two monomers of differing refractive index (Japanese Patent Publication No. 30301/1979), (iv) structures in which the distribution of refractive index is produced by polymerizing a monomer with a lower refractive index than that of a crosslinked polymer after diffusing from the surface of the polymer so that the monomer content in the polymer varies continuously from the surface to the inside of the structure (Japanese Patent Publication Nos. 5857/1977 and 37521/1981), and (v) structures in which a low-molecular weight compound with a lower refractive index than that of a reactive polymer is diffused from the surface of the polymer and reacted therewith to create a refractive index distribution varying continuously from the surface to the inside of the polymer (Japanese Patent Publication No. 29682/1982).

The distribution in the refractive index attained in these image-transmitting synthetic resin rods is expressed by the following equation:

$$n = n_a[1 - \tfrac{1}{2}(gr)^2] \quad (4)$$

wherein $n_a$ is the refractive index at the center axis, r is the radial distance from the center, and g is the distribution constant of the refractive index.

However, the refractive index distribution expressed by Eq. (4) is an approximation that can be applied to the distribution in refractive index at small values of g. Ideally, image-transmittability at the highest possible resolution can be obtained when the refractive index distribution equation represented as $n_r^2 = n_a^2 \mathrm{sech}^2(gr)$ is satisfied. Carrying out Taylor expansion of this theoretical formula on gr and calculating coefficients of the 4th and 6th power, we can obtain Eq. (1)

$$n_r^2 = n_a^2[1 - (gr)^2 + h_4(gr)^4 + h_6(gr)^6] \quad (1)$$

wherein $h_4$ and $h_6$ are higher order coefficients. The ideal refractive index distribution with the highest image-transmittability that can be obtained in Eq. (1) is when $h_4$ and $h_6$ in Eq. (1) and 2/3 and $-17/45$ respectively. Light delivered through a medium having the refractive index distribution described by Eq. (1) propagates as a curve that approximates a sine wave. Let us now evaluate the performance of an image-transmitting structure that constitutes a quarter-cycle along this wave.

Figure 2:
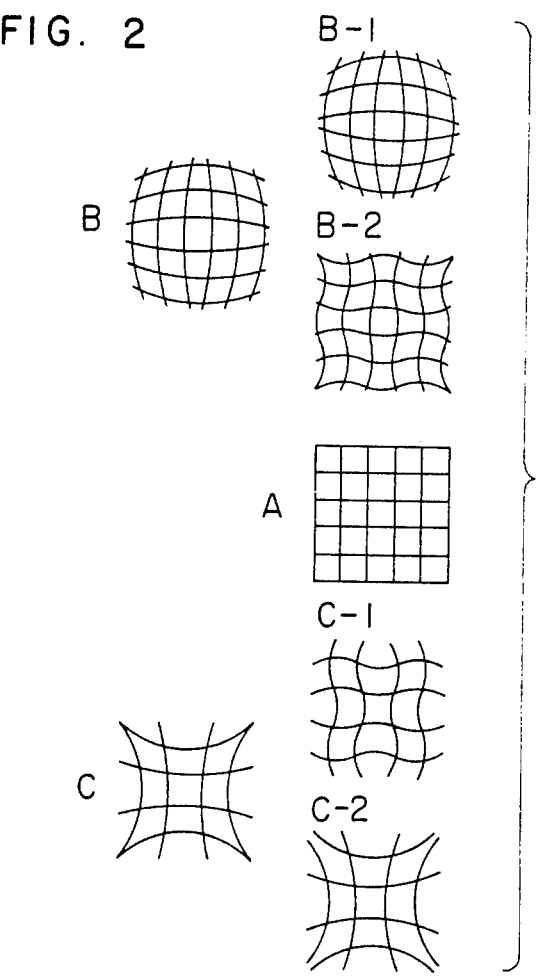

As shown in FIG. 1, this rod lens (2) is placed immediately in front of a square grid pattern (1) and a screen (4) set up on the opposite side to a light source (3). FIG. 2 shows the relationship between the grid pattern image formed on the screen (4) and the high order coefficients that appear in refractive index distribution equation (1). When $h_4$ is 2/3 and $h_6$ is $-17/45$, the grid pattern appears on the screen as a correct, undistorted image (A). When $h_4$ is larger than 2/3, the distribution curve shifts upward, producing a barrel distortion (B) in the image on the screen, and when $h_4$ is smaller than 2/3, the distribution curve shifts downward, resulting in a pincushion distortion (C) of the image.

When $h_6$ is larger or smaller than $-17/45$, a shift in the distribution curve arises mainly at a point closer to the surface of the rod, additionally resulting in either a pincushion distortion (B-1), (C-1) or barrel distortion (B-2), (C-2) of the grid pattern at the fringes of the image, respectively.

Of the above-mentioned known processes for producing image-transmitting structures, processes (i)–(iv) have inherent problems as industrial techniques: the production of image-transmitting structures of high resolving power is difficult, as is the selection of production conditions for improving the resolving power. Even if conditions for attaining high resolving power can be found, these processes do not always provide reproducibility. Process (v) is more advantageous than processes (i)–(iv) in that it allows for a broader selection of the conditions for creating a distribution in the refractive index and it provides a structure with a relatively good reproducibility. However, the production conditions described for process (v), which include the direct immersion of a reactive polymer in a reactant having lower refractive index than the polymer or a diluted solution of the reactant, often do not agree with the conditions necessary for creating a refractive index distribution suitable for image transmission. It is very difficult to select the conditions for this process (v) needed to overcome such problems as varying the temperature and the concentration of the processing solution with time to obtain the optimum distribution in the refractive index. Therefore, this process can provide only image transmitting structures having refractive index distributions with extremely small values of $gr_0$ ($gr_0 < 0.03$) in equation (1) and giving at best only a dark and obscure image transmission performance.

As a result of studies conducted on how to overcome such problems in the formation of a refractive index distribution, we found that image-transmitting synthetic resin rods having a desired refractive index distribution can be obtained with ease by using the materials indicated below and applying the method described below for forming a refractive index distribution.

Specifically, this invention provides an image-transmitting synthetic resin rod comprising a reaction product of an acrylic resin ① containing epoxy groups with a material ② having a refractive index 0.15–0.35 lower than that of said acrylic resin ①, and distributed is said rod so as to satisfy equation (1):

$$n_r^2 = n_a^2[1 - (gr)^2 + h_4(gr)^4 + h_6(gr)^6] \quad (1)$$

$$0.03 \leq gr. \leq 0.45$$

$$|h_4 - 2/3| \leq 100$$

$$|h_6 + 17/45| \leq 1,000$$

wherein r is the radial distance from the center axis of the rod ($0 \leq r \leq r_0$), $r_0$ is the radius of the rod,
$n_r$ is the refractive index at point r,
$n_a$ is the refractive index at the center of the rod,
g is the distribution constant of the refractive index, and
$h_4$ and $h_6$ are high order coefficients In addition, the present invention also provides a process for producing an image-transmitting synthetic resin rod having a refractive index distribution that satisfies equation (1)

$$n_r^2 = n_a^2[1 - (gr)^2 + h_4(gr)^4 + h_6(gr)^6] \quad (1)$$

$$0.03 \leq gr_0 \leq 0.45$$

$$|h_4 - 2/3| \leq 100$$

$$|h_6 + 17/45| \leq 1,000$$

wherein r is the radial distance from the center axis of the rod ($0 \leq r \leq r_0$), $r_0$ is the radius of the rod,
$n_r$ is the refractive index at point r,
$n_a$ is the refractive index at the center of the rod,
g is the distribution constant of the refractive index, and
$h_4$ and $h_6$ are high order coefficients in a cross section taken perpendicular to the center axis of the acrylic resin rod, which comprises the steps of swelling a rod made of an acrylic resin containing epoxy groups with a swelling agent so as to satisfy equation (2)

$$1.1 \leq V/V_0 \leq 3.0 \quad (2)$$

wherein $V_0$ is the volume of the rod before immersion in the swelling agent, and v is the volume of the rod after immersion and swelling in said swelling agent until the volume has substantially stabilized, and immersing the swollen acrylic resin rod in a reaction solution containing a material ② having a refractive index 0.15–0.35 lower than that of said acrylic resin ① and a reactivity to said epoxy groups so as to satisfy equation (3), $$0.8 \leq V'/V \leq 1.2 \quad (3)$$

wherein V' is the volume of the rod after immersion in the reactive solution containing material ② at a constant temperature for a predetermined period of time, followed by drying. The volume V of the polymer at which the liquid content of the polymer remains virtually constant refers to that volume at which the degree of swelling (V/V₀) of the resin rod after immersion fluctuates no more than 5% per hour, and no interface due to diffusion of the liquid can be observed visually in the swelled polymer; that is, where equilibrium swelling appears at a glance to have been attained.

Thus, previous swelling of the polymer before reaction with the compound having a lower refractive index enables the easy formation of the distribution in the refractive index required for image transmission. Since the degree of swelling is closely related to the type and molecular size of the compound to be reacted in the next step, it is desirable to increase the degree of swelling of the polymer prior to reaction and diffusion with increasing molecular size.

If the degree of swelling (V/V₀) of the rod made of acrylic resin containing epoxy groups is less than 1.1 after immersion in a swelling solution, when the acrylic resin rod is then immersed in the succeeding step in a diluted solution containing a compound that reacts with the epoxy groups and has a lower refractive index than the polymer, the diffusion rate of the compound into the polymer is too low; this significantly reduces productivity. In addition, the reaction preferentially takes place on the surface of the polymer, making it difficult to create the refractive index distribution progressively varying from the surface to the center of the rod that is required for image transmission. In this case, a sharp boundary in the refractive index forms between the unreacted center of the rod and the reacted surface of the rod as the reaction progresses, and the boundary can be observed to move gradually from the surface to the center of the rod. This boundary disappears after prolonged reaction, but by the time this happens, there is virtually no longer a gradient in the refractive index. Expressing this by means of Eq. (1) for the refractive index distribution, the value of $h_6 + 17/45$ that has a significant effect on the distribution in the refractive index at the surface is less than −1,000 at the initial stage of the reaction. The value of $h_4 - 2/3$ that has a significant effect on the distribution in the refractive index in the intermediate region between the center and the surface of the rod is less than −100 once the reaction has processed far enough to move the boundary into this region. In addition, $gr_0$ becomes less than 0.03 when the boundary disappears.

If the degree of swelling (V'/V) is greater than 3.0 when the acrylic resin rod is immersed in the swelling agent, when the polymer is dried following the formation of the refractive index distribution, the excess swelling causes stretching spots due to the weight of the rod, surface creasing arises due to shrinkage and, depending on the conditions, whitening or cracking of the polymer may arise.

Furthermore, even if a relatively good rod product can be obtained after drying, the result would only be an image-transmitting structure having a gradual refractive index gradient; a structure with poor image-transmitting properties that has a $gr_0$ value of less than 0.03. Accordingly, the degree of swelling should be set within a range capable of satisfying Eq. (2) upon immersion of the polymer in swelling agent.

Furthermore in cases where the degree of swelling (V'/V) is greater than 1.2 or less than 0.8, when the acrylic resin rod swelled within the range that satisfies Eq. (2) is reacted with material ② in a reaction solution containing the material ②, said acrylic resin rod repeatedly swells or shrinks as it reacts with the epoxy group. In this case the values of $h_4$ and $h_6$ in Eq. (1) representing the distribution in the refractive index deviate greatly from the theoretical values 2/3 and −17/45 making it difficult to obtain clear transmission images.

Specifically, if the value (V'/V) becomes less than 0.8, shrinkage of the swelled gel arises as the reaction proceeds, tending to inhibit diffusion of the reactants into the resin rod. As the result, because the reaction proceeds preferentially on the surface of the rod, the refractive index gradient near the surface layer increases, resulting in a tendency for the value of $h_6$ to become less than −17/45.

On the other hand, if the value (V'/V) exceeds 1.2, the gel swells again as the reaction proceeds, promoting diffusion of the reactants into the resin rod. This causes the gradient in the refractive index to be more gradual near the surface layer of the rod resulting in a tendency for the values of $h_4$ and $h_6$ to become greater than 2/3 and −17/45 respectively. Accordingly, the reaction conditions must be set such that the degree of swelling of the polymer lies within a range capable of satisfying Eq. (3) when the material ② is diffused into the polymer swelled within the range capable of satisfying Eq. (2).

Specific examples of the acrylic resin polymer containing epoxy groups that may be used in this invention include those copolymers comprising at least one monomer selected from the group consisting of glycidyl acrylate, glycidyl methacrylate, β-methylglycidyl methacrylate, β-methylglycidyl acrylate, and an other monomer, such as methylmethacrylate, ethylmethacrylate, propylmethacrylate, cyclohexylmethacrylate, benzylmethacrylate, phenylmethacrylate, styrene, α-methyl styrene, trifluoroethylmethacrylate, hexafluoroisopropylmethacrylate, pentafluoropropylmethacrylate, ethylene glycol dimethacrylate, pentaerythritol diacrylate, and trimethylolpropane triacrylate, or homopolymers of, for example, glycidylmethacrylate or homopolymers of, for example, glycidylmethacrylate or β-methylglycidylmethacrylate. Since the glass transition temperature of the polymer should in practice be at least 60° C., and preferably at least 70° C., for the image transmitting structure, polymers mainly comprising β-methylglycidylmethacrylate are the most desirable since they exhibit relatively good heat stability of the epoxy group, high transparency and a relatively high glass transition temperature of about 75° C.

There is no particular restriction on the content of the epoxy groups in the polymer, but since this has a bearing on the refractive index difference between the surface and the center of the polymer, the content is related to the view range of the images to be read. If the content of epoxy group-containing monomer in the polymer is less than 10 mole % as expressed in monomer mole %, it provides only a image-transmitting structure with low light transmission and a narrow view range. Accordingly, it is desirable in practice to incorporate at least 10 mole % of the epoxy group-containing monomer into the polymer, and preferably at least 40 mole %.

The rod made of acrylic resin containing epoxy groups for use in this invention is desirably produced by means of a bulk polymerization process. The methods that may be used to shape the rod include, for example, charging a mixture of a monomer or partially polymerized product and a polymerization initiator into a cylindrical vessel of precisely uniform diameter and the highest possible circularity, followed by heat- or photo-polymerization; or cutting a resin plate prepared by polymerizing between two reinforced glass sheets, and grinding the polymer plate into a cylindrical configuration. Preferred cylindrical vessels for the first process include glass tubes with enhanced surface releasing properties, polypropylene or polyethylene tubes, and polytetrafluoroethylene tubes. Tubes having an inner diameter of about 0.5–10 mm are suitable for preparing the polymer rods used in this invention.

The polymerization initiators that may be used include ordinary heat polymerization initiators such as azobisisobutyronitrile, benzoyl peroxide, and laurylolyl peroxide; photopolymerization initiators such as benzoin alkylethers. Combinations of two or more of these polymerization initiators may also be used. To minimize the generation of gas bubbles in the polymer during production of the cylindrical polymer rod, a method of polymerizing a partial polymerizate under elevated pressure while varying the polymerization temperature may be employed, but it is necessary to properly determine and select the polymerization conditions for the kind and size of the tube used in polymerization.

Liquid, that may be employed as the swelling agent used in this invention for the acrylic resin containing epoxy groups include, but are not limited to, one or more components selected from the group consisting of methanol, ethanol, propanol, ethylene glycol, 1,1-dimethoxypropane, 2,2-dimethoxypropane, ethylene glycol diethyl ether 1,1-dimethoxycyclohexane and 1,1-diethoxypropane, and mixed solvents comprising methyl acetate, ethyl acetate, methyl ethyl ketone, methylal, anisole, ethylene glycol dimethoxide, dioxane, cyclohexene oxide, or 1,1-dimethoxyethane and ethyl ether, propyl ether or butyl ether. If the polymer comprises mostly methacrylate, the solvent should preferably be a solvent consisting of at least one compound selected from the group consisting of methanol, ethanol, 1,1-dimethoxypropane, 2,2-dimethoxypropane, ethylene glycol diethyl ether, 1,1-diethoxyethane and 1,1-diethoxypropane, or a mixed solvent consisting of ethylene glycol dimethyl ether and isopropyl ether.

Compounds usable in this invention as the material ② that reacts with the epoxy groups and has a low refractive index include those having at least fluoroalkyl group selected, for example, from the groups $C_nF_{2n+1}-$, $C_nF_{2n+1}CH_2-$, $H(CF_2CF_2)_m-$, and $H(CF_2CF_2)_mCH_2-$, wherein n is an integer from 1 to 8 and m is an integer from 1 to 4. To provide the acrylic resin polymer containing epoxy groups with the refractive index distribution shown by Eq. (1):

$$n_r^2 = n_a^2[1-(gr)^2+h_4(gr)^4+h_6(gr)^6] \quad (1)$$

$0.03 \leq gr_0 \leq 0.45$
$|h_4 - 2/3| \leq 100$
$|h_6 + 17/45| \leq 1,000$ wherein r is the radial distance from the center axis of the rod ($0 \leq r \leq r_0$),
$r_0$ is the radius of the rod,
$n_r$ is the refractive index at point r, and
$n_a$ is the refractive index at the center of the rod,
by the reaction with a compound having fluoroalkyl group, if the fluorine content of the fluoroalkyl groups in the compound is insufficient, the value of $gr_0$ in Eq. (1) is too small, thereby rendering the transmitted images dark and obscure. On the other hand, if the fluoroalkyl content is too large, the diffusion rate of the fluoroalkyl groups into the polymer is significantly retarded, greatly lowering productivity. Accordingly, the molecular weight of the compound containing fluoroalkyl groups, should preferably lie within a range of about 80 to 900. Specific examples of these compounds include fluorinated carboxylic acid represented by general formulas (I)-(IV), fluorinated carboxylic acid anhydride represented by general formulas (V)-(VIII), and fluorinated alcohols represented by general formulas (IX)-(XII), as shown below:

$$C_nF_{2n+1}COOH \quad [I]$$

$$C_nF_{2n+1}CH_2COOH \quad [II]$$

$$H(CF_2CF_2)_mCOOH \quad [III]$$

$$H(CF_2CF_2)_mCH_2COOH \quad [IV]$$

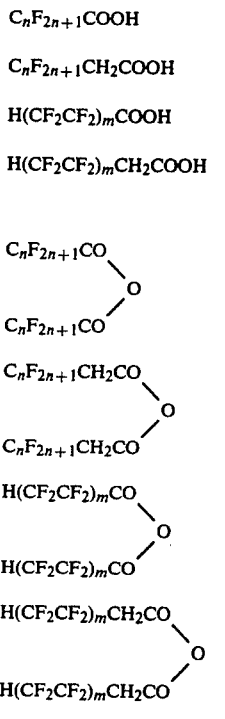

[V]

[VI]

[VII]

[VIII]

$$C_nF_{2n+1}CH_2OH \quad [IX]$$

$$C_nF_{2n+1}CH_2CH_2OH \quad [X]$$

$$H(CF_2CF_2)_mCH_2OH \quad [XI]$$

$$H(CF_2CF_2)_mCH_2CH_2OH \quad [XII]$$

wherein n is an integer from 1 to 8 and m is an integer from 1 to 4.

Since trifluoroacetic acid and trifluoroacetic anhydride, which correspond to the fluorinated carboxylic acid and fluorinated carboxylic acid anhydride represented by the general formulas (I)-(XII) when n=1, provide the compound resulting from the addition reaction with the epoxy groups a somewhat poor heat resistance under humid conditions, care has to be taken when using these in applications requiring heat resistance. When using a fluorinated alcohol represented by the general formulas (IX)-(XII), because this has a somewhat lower reactivity with the epoxy groups, it should be used together with a basic catalyst such as a metal alkoxide or a tertiary amine, or an acid catalyst such as sulfuric acid, boron trifluoride ethyl ether complex, boron trifluoride methanol complex, boron trifluoride trifluoroethanol complex, on a carboxylic acid, such as those cited in Chemistry and Technology, Chapter 3: Epoxy Resins (edited by Clayton A. May and Yoshio Tanaka, Dekker Inc., 1973), in order to accelerate the reaction. Thus, of the compounds represented by the general formulas given above, those most desirable for readily practicing the invention include the fluorinated carboxylic acids and fluorinated carboxylic acid anhydrides represented by the following formulas:

$$C_nF_{2n+1}COOH$$

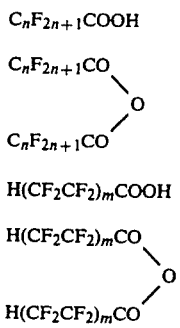

$$H(CF_2CF_2)_mCOOH$$

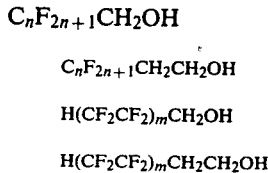

wherein n is an integer from 2 to 8 and m is an integer from 1 to 4.

The reaction of the compound represented by general formulas (I)-(XII) and the rod made of acrylic resin containing epoxy groups is carried out in a swelled state that satisfies Eq. (3). In order to provide the polymer with a satisfactory image-transmitting performance, compound ②, which reacts with the epoxy groups and has a refractive index lower than that of the acrylic resin containing epoxy groups, must be provided in a continuous concentration gradient from the surface to the interior of the polymer. To achieve this, the concentration of compound ② must be diluted properly such as to satisfy Eq. (3), and an appropriate solution temperature selected.

When integers n and m in general formulas (I)-(XII) are greater than 8 and 4 respectively, the molecular size of the compound becomes too large, resulting in too low a diffusion rate of the compound into the swelled polymer and thus requiring a long time for the production of the image-transmitting structure. Accordingly, the values of n and m should preferably be less than 8 and 4 respectively.

The diluent employed to satisfy Eq. (2) when the compound represented by general formulas (I)-(XII) and the polymer are reacted may include, but is not limited to, at least one solvent selected from the group consisting of methanol, ethanol, propanol, ethylene glycol, anisole, ethylene glycol dimethyl ether, 1,1-dimethoxypropane, 2,2-dimethoxypropane, 1,1-diethoxyethane, 1,2-diethoxyethane, 1,1-dimethoxycyclohexane, and 1,1-diethoxypropane, or a mixture comprising methyl acetate, ethyl acetate, methyl ethyl ketone, methylal, 1,1-dimethoxyethane, 1,2-dimethoxyethane, dioxane or cyclohexene oxide, and ethyl ether, isopropyl ether or n-butyl ether.

In distributing the compound that reacts with the epoxy groups in a continuously varying concentration gradient from the surface to the center of the polymer rod, and in subsequently removing the polymer rod from the reaction vessel for drying, it is best to use a 2-step drying process in which preliminary drying is effected at a temperature not more than 10° C. higher than the boiling point for the diluent of the reaction solution and a second drying step carried out a temperature of 120°-150° C. until very little diluent remains in the polymer. Sudden heating at a high temperature may undesirably result in the formation of gas bubbles in the polymer.

When the diluent used in the reaction solution is a mixed solvent, the rod may whiten during drying. If this happens, the polymer rod should be immersed in a low-boiling solvent after the reaction and prior to the drying step, and drying carried out after solvent displacement. Methanol is a good example of an appropriate displacement solvent that may be used for this purpose.

The image-transmitting synthetic resin rod produced in this way is cut into any desired length and the cut surfaces polished for use.

The image-transmitting synthetic resin rod according to this invention has excellent image-transmitting properties and can therefore be put to a wide variety of uses, including lens arrays for copiers, optical fiber coupling devices, optical filters, rod lenses used in line sensors, and grated index type optical fibers.

This invention will now be explained in greater detail by way of several examples.

The method used to prepare the transparent polymer and to evaluate the degree of swelling and the image-transmitting performance are described below.

(1) Preparation of rods made of acrylic resin containing epoxy groups

A starting polymerizing solution with the initial composition shown in Table 1 was poured into a polytetrafluoroethylene tube with an inside diameter of 3 mm, a wall thickness of 1 mm, and a length of 30 cm. The first polymerization step was carried out in a constant temperaure water bath controled at 70° C. for 2 hours, and the second polymerization step was carried out in an air bath controled at 120° C. for 2 hours to obtain transparent polymers rods a–e.

TABLE 1

| Transparent polymer rod | Initial composition | |
|---|---|---|
| | Components | Parts by weight |
| a | β-methylglycidyl methacrylate | 100 |
| | azobisisobutyronitrile | 0.05 |
| b | β-methylglycidyl methacrylate | 50 |
| | methylmethacrylate | 50 |
| | azobisisobutyronitrile | 0.05 |
| c | β-methylglycidyl methacrylate | 10 |
| | methylmethacrylate | 90 |
| | azobisisobutyronitrile | 0.05 |
| d | glycidyl methacrylate | 50 |
| | methylmethacrylate | 50 |
| | azobisisobutyronitrile | 0.05 |
| e | β-methylglycidyl methacrylate | 99.5 |
| | ethylene glycol methacrylate | 0.5 |
| | azobisisobutyronitrile | 0.05 |

(2) Evaluation of the degree of swelling of the rod

The polymer rod was immersed in a glass vessel comprising a pair of parallel polished glass surfaces opposed to each other. The outside diameter ($2R_0$) and length ($l_0$) before swelling, as well as the outside diameter ($2R$) and length ($l$) after swelling of the rod were measured perpendicular to the plane of the polished glass using a cathetometer, and the degree of swelling calculated from the following equation:

$$V/V_0 = R^2 l / R_0^2 l_0$$

where $V_0$: volume of the polymer before swelling,
V: volume of the polymer after swelling.

The value of $V'/V$ was measured in the same manner as the value of $V/V_0$:

$$V'/V = R_1^2 l_1 / R^2 l$$

where V': volume of the polymer after immersion for a predetermined length of time in a dilute solution containing a low molecular weight compound that reacts with the epoxy groups and has a lower refractive index than the polymer,
$2R_1$: outside diameter of the polymer when immersed in the dilute solution, and
$l_1$: length of the polymer when immersed in the dilute solution.

(3) Evaluation of image-transmitting performance

The image-transmitting performance was evaluated by measuring the distribution in the refractive index for the image-transmitting synthetic resin rod prepared. The highest resolving power was obtained as described by Kenichi Iga in Applied Optics, Vol. 19, p. 1099 (1980), at coefficient $h_4$ and $h_6$ values of $\frac{2}{3}$ and $-17/45$ respectively in Eq. (1), which represents the distribution in the refractive index:

$$n^2(r) = n_a^2[1 - (gr)^2 + h_4(gr)^4 + h_6(gr)^6] \quad (1)$$

wherein r is the radial distance from the center of a cross section taken perpendicular to the center axis of the rod,
n(r) is the refractive index at point r, and
$n_a$ is the refractive index at the center of the rod.

The refractive index distribution for the prepared image-transmitting structure was measured by the same method employed for determining the refractive index with an Interphako interference microscope described by Yasuji Ohtsuka and Yasuhiro Koike in Applied Optics, Vol. 19, No. 16, p. 2866 (1980). The values of g, $h_4$, and $h_6$ that best correspond to the measured refractive index distribution curve were calculated by the least squares method. The image-transmitting performance was determined to be better as the calculated values of $h_4$ and $h_6$ were closer to the theoretical values $\frac{2}{3}$ and $-17/45$.

EXAMPLE 1

Transparent polymer rod a was immersed in a swelling solution comprising 50 parts by weight of ethylene glycol dimethyl ether and 50 parts by weight of isopropyl ether at 65° C. for 12, 13, and 14 hours. The degree of swelling was measured for each of these immersion times, and found to be essentially constant at 1.44, 1.44, and 1.445. A specimen immersed in the swelling solution for 15 hours was then directly immersed in a reaction solution comprising 50 parts by weight of ethylene glycol dimethyl ether, 50 parts by weight of isopropyl ether, and 4 parts by weight of heptafluorobutyric acid at 65° C., and reacted for 7 hours. The swelling degree (V'/V) of polymer a at this point was 1.10. Next the polymer rod was directly immersed in methanol at room temperature for one hour to displace the original solvent, then dried at reduced pressure in a vacuum dryer, first at 75° C. for 12 hours, and again at 120° C. for 24 hours to give an image-transmitting synthetic resin rod.

The values of $gr_0$, $h_4$, and $h_6$ determined for this resin structure by measurement of the refractive index distribution were 0.233, 11.3, and −58.8. The structure had an excellent image-transmitting performance.

EXAMPLE 2

Transparent polymer rod a was immersed in a swelling solution comprising 60 parts by weight of ethylene glycol dimethyl ether and 40 parts by weight of isopropyl ether at 65° C. for 13, 14, and 15 hours. The degree of swelling was measured for each of these immersion times, and found to be essentially constant at 1.55, 1.555, and 1.56. A specimen immersed in the swelling solution for 15 hours was then directly immersed in a reaction solution comprising 60 parts by weight of ethylene glycol dimethyl ether, 40 parts by weight of isopropyl ether, and 4 parts by weight of 7-H dodecafluoroheptanoic acid at 65° C. for 18 hours. The degree of swelling (V'/V) of the polymer a at this point was 1.15. The polymer rod was directly immersed in methanol at room temperature for one hour to displace the solvent, then dried at reduced pressure in a vacuum dryer at 75° C. for 12 hours, and again at 120° C. for 24 hours to give an image-transmitting synthetic resin structure.

The values of $gr_0$, $h_4$, and $h_6$ determined for this resin structure by measurement of the refractive index distribution were 0.210, 16.7, and −197.6. The structure had an excellent image-transmitting performance.

EXAMPLE 3

Transparent polymer rod a was immersed in a swelling solution comprising 60 parts by weight of ethylene glycol dimethyl ether and 40 parts by weight of isopropyl ether at 65° C. for 13, 14, and 15 hours. The degree of swelling was measured for each of these immersion times, and found to be essentially constant at 1.55, 1.555, and 1.56. A specimen immersed in the swelling solution for 15 hours was then directly immersed in a reaction solution comprising 60 parts by weight of ethylene glycol dimethyl ether, 40 parts by weight of isopropyl ether, and 4 parts by weight of pentadecafluorooctanoic acid at 65° C. for 14 hours. The swelling degree (V'/V) of the polymer a at this point was 1.10. The polymer rod was directly immersed in methanol at room temperature for one hour to displace the solvent, then dried at reduced pressure in a vacuum dryer at 75° C. for 12 hours, and again at 120° C. for 24 hours to give an image-transmitting synthetic resin structure.

The values of $gr_0$, $h_4$, and $h_6$ determined for this resin structure by measurement of the refractive index distribution were 0.153, 16.7, and −474.5. The structure has an excellent image-transmitting performance.

EXAMPLES 4–13, COMPARATIVE EXAMPLES 1–3

Image-transmitting synthetic resin structures were prepared under essentially the same conditions as in Example 1, the only difference being in the swelling conditions in the first step and the conditions for the reaction with the low molecular weight compound to reduce the refractive index in the second step. The image-transmitting performances of these structures were then evaluated.

The conditions used, and the results of the evaluations of image-transmitting performance are shown in Table 2 for each of the Examples and the Comparative Examples.

TABLE 2

| No. | Transparent rod polymer | Swelling condition Composition of immersion liquid (wt. %) | Swelling condition Temp./Time (°C.)(hr) | Degree of swelling (V/V₀) | Composition of reaction solution (Parts by weight) | Reaction condition Temp./Time (°C.)(hr) | Degree of swelling (V'/V) | Lens performance $Gr_0$ | Lens performance $h_4$ | Lens performance $h_6$ | Remarks |
|---|---|---|---|---|---|---|---|---|---|---|---|
| Example 4 | a | EtOH (100) | 70/7 | 1.41 | EtOH (30) IPE (68) 7FBA (2) | 62/1.5 | 1.01 | 0.105 | 42.7 | −935 | |
| 5 | b | MeOH (100) | 60/7 | 1.37 | MeOH (49) Et₂O (50) 7FBA (1) | 33/20 | 1.05 | 0.072 | 38.4 | −750.1 | |
| 6 | a | DMP (100) | 75/15 | 1.30 | DMP (100) 7FBA (1) | 75/5 | 1.10 | 0.162 | 15.3 | −60.3 | |
| 7 | a | GDE (100) | 75/15 | 1.45 | GDE (100) 7FBA (2) | 75/4 | 1.15 | 0.142 | 15.1 | −520 | |
| 8 | a | GDM (50) IPE (50) | 65/15 | 1.45 | GDM (50) IPE (50) 8FPA (1) 12FHA (1) | 65/10 | 1.17 | 0.312 | 13.4 | −68.5 | |
| 9 | a | GDM (50) IPE (50) | 65/15 | 1.45 | GDM (50) IPE (50) 7FBA (1) 15FOA (0.5) | 65/7 | 1.15 | 0.356 | 12.3 | −55.1 | |
| 10 | c | MeOH (100) | 60/6 | 1.36 | MeOH (99) 7FBA (1) | 33/19 | 1.05 | 0.032 | 920 | 250.5 | Narrow view. |
| 11 | d | MeOH (100) | 55/7 | 1.375 | MeOH (90) 7FBA (10) | 30/2.25 | 1.05 | 0.065 | 15.3 | −139 | Aging change of served under humid heating. |
| 12 | e | GDM (55) IPE (45) | 65/15 | 1.45 | GDM (55) IPE (45) 7FBA (2) | 65/8 | 1.10 | 0.251 | 15.5 | −40.3 | |
| 13 | a | GDM (50) IPE (50) | 65/15 | 1.45 | GDM (50) IPE (50) 8FPA (4) | 65/5 | 1.12 | 0.150 | −77.5 | 870 | |
| Comparative Example 1 | a | MeOH (50) EtAC (50) | 60/5 | 3.5 | MeOH (50) Et₂O (50) 7FBA (1) | 30/20 | 0.7 | — | — | — | Cracks developed upon drying. |
| 2 | a | Et₂O (100) | 30/72 | 1.05 | MeOH (99) 7FBA (1) | 33/19 | 1.35 | — | — | — | Boundary appearing in the resin due to solution diffusion |

TABLE 2-continued

| No. | Transparent rod polymer | Swelling condition | | Degree of swelling (V/V₀) | Composition of reaction solution (Parts by weight) | Reaction condition | | Lens performance | | | Remarks |
|---|---|---|---|---|---|---|---|---|---|---|---|
| | | Composition of immersion liquid (wt. %) | Temp./Time (°C.) (hr) | | | Temp./Time (°C.) (hr) | Degree of swelling (V'/V) | $Gr_0$ | $h_4$ | $h_6$ | |
| 3 | a | MeOH (100) | 60/7 | 1.35 | MeOH (98) 7FBA (1) | 35/24 | 1.3 | 0.130 | −2,500 | 210,000 | upon reaction. Not imaged. |

Note:
EtOH: ethanol
MeOH: methanol
DMP: 2,2-dimethoxypropane
GDE: ethylene glycol diethyl ether
GDM: ethylene glycol dimethyl ether
IPE: isopropyl ether
EtAc: ethyl acetate
Et₂O: ethyl ether
7FBA: heptaflurorbutyric acid
C₃F₇COOH
8FPA: 5H—octafluoropentanoic acid
H(CF₂CF₂)₂COOH
12FHA: 7H—dodecafluoroheptanoic acid
H(CF₂CF₂)₃COOH
15FOA: heptadecafluorooctanoic acid
C₇F₁₅COOH

EXAMPLE 14

A transparent polymer rod was prepared under essentially the same conditions as transparent polymer a shown in Table 1, except for the use of a polytetrafluoroethylene tube having an inside diameter of 2 mm.

The transparent polymer rod was immersed in a swelling solution comprising 55 parts by weight of ethylene glycol dimethyl ether and 45 parts by weight of isopropyl ether at 65° C. for 10, 11, and 12 hours. The degree of swelling was measured for each of these immersion times, and found to be essentially constant at 1.44, 1.45, and 1.46. A specimen immersed in the swelling solution for 12 hours was then directly transferred to a reaction solution comprising 55 parts by weight of ethylene glycol dimethyl ether, 45 parts by weight of isopropyl ether, and 2 parts by weight of heptafluorobutyric acid at 65° C., and reacted for 5 hours. The swelling degree (V'/V) of the polymer rod at this point was 1.05. The polymer rod was directly immersed in methanol at room temperature for one hour to displace the previous solvent. It was then dried, first under reduced pressure at 75° C. for 12 hours, and again at 120° C. for 24 hours, giving an image-transmitting synthetic resin structure. The values of $gr_0$, $h_4$, and $h_6$ determined for this resin structure by measurement of the refractive index distribution were 0.210, 7.3, and 20.5. The structure had an excellent image-transmission performance.

EXAMPLE 15

A transparent polymer rod was prepared under essentially the same conditions as transparent polymer a shown in Table 1, except for the use of a polytetrafluoroethylene tube having an inside diameter of 5 mm.

The transparent polymer rod was immersed in a swelling solution comprising 60 parts by weight of ethylene glycol dimethyl ether and 40 parts by weight of isopropyl ether at 60° C. for 20, 22, and 24 hours. The degree of swelling was measured for each of these immersion times, and found to be essentially constant at 1.40, 1.41, and 1.42. A specimen immersed in the swelling solution for 24 hours was then directly transferred to a reaction solution comprising 60 parts by weight of ethylene glycol dimethyl ether, 40 parts by weight of isopropyl ether, and 0.8 parts by weight of heptafluorobutyric acid at 60° C., and reacted for 16 hours. The swelling degree (V'/V) of the polymer rod at this point was 1.10. The polymer rod was directly immersed in methanol at room temperature for 1.5 hours to displace the previous solvent. It was then dried, first under reduced pressure at 75° C. for 24 hours, and again at 120° C. for 24 hours, giving a image-transmitting synthetic resin structure.

The values of $gr_0$, $h_4$, and $h_6$ determined for this resin structure by measurement of the refractive index distribution were 0.331, 15.3, and 451. The structure had an excellent image-transmission performance.

What is claimed is:

1. A method of modifying the structure of a (meth)acrylate rod such that it has a refractive index distribution that satisfies the equation (1):

$$n_r^2 = n_a^2[1 - (gr)^2 + h_4(gr)^4 + h_6(gr)^6] \quad (1)$$

$$0.03 \leq gr_0 \leq 0.45$$

$$|h_4 - 1| \leq 100$$

$$|h_6 + 17/45| \leq 1,000$$

wherein r is the radial distance from the center axis of the rod ($0 \leq r \leq r_0$),
  $r_0$ is the radius of the rod,
  $n_r$ is the refractive index at point r,
  $n_a$ is the refractive index at the center of the rod,
  g is the distribution constant of the refractive index, and
  $h_4$ and $h_6$ are high order coefficients
in a cross section taken perpendicular to the center axis of the (meth)acrylate resin rod, which comprises the steps of:
  (a) swelling a rod formed from a glycidyl(meth)acrylate resin or a resin formed by polymerizing at least one glycidyl(meth)acrylate monomer with another copolymerizable monomer such that the polymer product has a glycidyl group content of at least 10 mole % with a swelling agent such that the rods satisfies the conditions of equation (2):

$$1.1 \leq V/V_o \leq 3.0 \quad (2)$$

wherein $V_o$ is the volume of the rod before immersion in the swelling agent, and V is the volume of the rod after immersion and swelling in said swelling agent until the volume has substantially stabilized;

(b) immersing the swollen rod in a solution containing a compound having at least one fluoroalkyl group, wherein the fluorine bearing carbon atom content in said at least one group ranges from 1 to 8, said compound having a refractive index 0.15–0.35 lower than that of the acrylic resin of the rod and a reactivity to the epoxy groups in the glycidyl component of said resin such that the treated rod satisfies the condition of $$0.8 \leq V'/V \leq 1.2 \qquad (3)$$

wherein V' is the volume of the rod after immersion in said solution at a constant temperature for a predetermined period of time; and then (c) drying the rod.

2. The method of claim 1, wherein said fluoroalkyl group containing compound has a molecular weight of from 80 to 900.

3. The method of claim 1, wherein said glycidyl(meth)acrylate based resin is prepared by bulk polymerization.

4. The method of claim 2, wherein said fluoroalkyl group containing compound is at least one compound selected from the group consisting of the compounds of formulas (I) through (XII) below:

$C_nF_{2n+1}COOH$ (I), $C_nF_{2n+1}CH_2COOH$ (II), $H(CF_2CF_2)_mCOOH$ (III), $H(CF_2CF_2)_mCH_2COOH$ (IV),

(V)

(VI)

(VII)

(VIII), $C_nF_{2n+1}CH_2OH$ (IX), $C_nF_{2n+1}CH_2CH_2OH$ (X), $H(CF_2CF_2)_mCH_2OH$ (XI) and $H(CF_2CF_2)_mCH_2CH_2OH$ (XII), wherein n is an integer of from 1 to 8 and m is an integer of from 1 to 4.

5. The process of claim 1, wherein the swelling agent comprises at least one compound selected from the group consisting of methanol, ethanol, 1,1-dimethoxypropane, 2,2-dimethoxypropane, ethylene glycol diethyl ether, 1,1-diethoxyethane, and 1,1-dimethoxycyclohexane, or is a mixture of ethylene glycol dimethyl ether and isopropyl ether.

6. The method of claim 1, wherein said solution is prepared by dissolving said fluoroalkyl group containing compound in at least one compound selected from the group consisting of methanol, ethanol, 1,1-diethoxypropane, 2,2-dimethoxypropane, ethylene glycol diethyl ether, 1,1-diethoxypropane and 1,1-dimethoxycyclohexane, or in a mixture of ethylene glycol dimethyl ether and isopropyl ether.

7. The method of claim 1, wherein said another copolymerizable monomer is methyl methacrylate, ethyl methacrylate, propyl methacrylate, cyclohexyl methacrylate, benzyl methacrylate, phenyl methacrylate, styrene, α-methyl styrene, trifluoroethyl methacrylate, hexafluoroisopropyl methacrylate, pentafluoropropyl methacrylate, ethylene glycol dimethacrylate, pentaerythritol diacrylate or trimethylolpropane, triacrylate.

8. An image-transmitting (meth)acrylate resin rod prepared by the process of claim 1.

9. The rod of claim 8, wherein the resin of said rod has a glass transition temperature of at least 70° C.

10. The rod of claim 8 or 9, wherein said (meth)acrylate resin is a β-methylglycidyl methacrylate based polymer.

11. The rod of claim 10, wherein the content of β-methylglycidyl methacrylate units in said polymer is at least 10 mole %.

12. The rod of claim 10, wherein the content of β-methylglycidyl methacrylate unit in said polymer is at least 40 mole %.

13. The rod of claim 8, wherein the fluoroalkyl groups of said fluoroalkyl group containing compound have the structures:

$C_nF_{2n+1}$-, $C_nF_{2n+1}CH_2$-, $H(CF_2CF_2)_m$-, $H(CF_2CF_2)_mCH_2$- wherein n is an integer of from 1 to 8 and m is an integer of from 1 to 4.